United States Patent
Kovac et al.

(10) Patent No.: US 12,408,040 B2
(45) Date of Patent: Sep. 2, 2025

(54) QUANTUM-RESISTANT SIM CARD

(71) Applicant: QRC AAA SARL, Fribourg (CH)

(72) Inventors: Stiepan Aurelien Kovac, Geneva (CH); John Gregory Underhill, Ottawa (CA)

(*) Notice: Subject to any disclaimer, the term of this patent is extended or adjusted under 35 U.S.C. 154(b) by 62 days.

(21) Appl. No.: 17/610,413

(22) PCT Filed: Nov. 11, 2019

(86) PCT No.: PCT/IB2019/001133
§ 371 (c)(1),
(2) Date: Nov. 10, 2021

(87) PCT Pub. No.: WO2020/229871
PCT Pub. Date: Nov. 19, 2020

(65) Prior Publication Data
US 2022/0240095 A1    Jul. 28, 2022

(30) Foreign Application Priority Data

May 10, 2019 (CH) .................................. 00620/19
Jun. 6, 2019 (CH) .................................. 00731/19

(51) Int. Cl.
*H04K 1/00* (2006.01)
*H04W 12/04* (2021.01)
*H04W 12/30* (2021.01)

(52) U.S. Cl.
CPC ............ *H04W 12/35* (2021.01); *H04W 12/04* (2013.01)

(58) Field of Classification Search
CPC ..... H04W 12/35; H04W 12/04; H04W 12/03; H04W 12/40; H04L 9/0852; H04L 9/0631
(Continued)

(56) References Cited

U.S. PATENT DOCUMENTS 9,912,479 B1* 3/2018 Yamada ................. H04L 9/002
2011/0238580 A1* 9/2011 Coppinger ........... H04L 67/306
705/65

(Continued)

OTHER PUBLICATIONS

Benoit Gerhard, AHX-Preliminary Security Analysis, Apr. 29, 2019, Kudelski Security, pp. 1-15 (Year: 2019).*
(Continued)

*Primary Examiner* — Jeffrey C Pwu
*Assistant Examiner* — Samuel Ambaye
(74) *Attorney, Agent, or Firm* — Goodwin Procter LLP

(57) ABSTRACT

A quantum resistant smart card is configured to enable access to mobile or integrated telecommunications networks for a cellular communication device, and comprises: encryption means configured for an encryption of data by a standard of at least 256-bit encryption from the list comprising at least AES-256 as defined in the ISO/IEC 18033-3:2011 standard and eAES; dynamic loading means configured to dynamically load in an intended legacy communication device an upgraded protocol stack enabling the intended legacy communication device to connect to a New Radio network by reusing existing frequencies mastered by the intended legacy communication device; and at least one hardware accelerator system which enables the smart card to provide support for the encryption of data according to the standard of at least 256-bit encryption from the list comprising at least AES-256 as defined in the ISO/IEC 18033-3:2011 standard and eAES.

21 Claims, 6 Drawing Sheets

(58) Field of Classification Search
USPC .................................................. 380/270
See application file for complete search history.

(56) References Cited

U.S. PATENT DOCUMENTS

| | | | | |
|---|---|---|---|---|
| 2014/0220952 | A1* | 8/2014 | Holtmanns | H04W 4/50 |
| | | | | 455/418 |
| 2017/0127217 | A1* | 5/2017 | Miao | H04W 76/15 |
| 2020/0266989 | A1* | 8/2020 | Krcmaricic-Barackov | |
| | | | | H04L 9/30 |

OTHER PUBLICATIONS

Noakhali Science and Technology University, Extended Advanced Encryption Standard with Extended Security, 2018, Advance in science, technology and engineering systems, vol. 3, pp. 51-56 (Year: 2018).*

Ok, K., et al., Design of a key exchange protocol between SIM card and service provider, 2015 23rd Telecommunications Forum Telfor (TELFOR): 281-284 (2015).

PCT/IB2019/001133 International Search Report and Written Opinion mailed Feb. 17, 2020, 11 pages.

PCT/IB2019/001133 International Preliminary Report on Patentability mailed Nov. 25, 2021, 9 pages.

Gerhard, B., AHX-Preliminary Security Analysis, Retrieved from the Internet: URL: https://git.fsfe.org/Stie/Pqsym/raw/branch/master/2019-04-29-Kudelski-AHX-Analysis-v01.05.pdf [retrieved on Feb. 7, 2020].

Underhill, J.G., Towards post-quantum symmetric cryptography, Retreived from the Internet: URL: https://git.fsfe.org/Stie/Pqsym/commit/7ce8aab6a9b4d4071ec58ac41e46bdd928b36ec7 [retrieved on Feb. 7, 2020].

Alapatt, B.P., An Enhanced Advanced Encryption Standard (EAES) Algorithm for Secure Fiber Optic Communication, International Journal of Advanced Research in Computer Science, 9: 167-171 (2018).

* cited by examiner

```
SecureExpansion(byte key[4*Nk], word w[Nb*(Nr+1)], word Nr)
begin
    word ks = Nb * (Nr + 1) * 4
    byte tmp[ks]
    tmp = HKDF-Expand(key, dc, ks)

while (i < ks)
        w[i/4] = word(tmp[i], tmp[i+1], tmp[i+2], tmp[i+3])
        i = i+4
    end while
end
```

FIG. 5

Key Schedule

Round key expansion (key schedule):
subkeys = HKDF-expand(key, info, L)
where L = RN (rount count) + 1 * 16
key = the input cipher key
info = the ciphers formal name string Rounds function Round counts by input key size:
256-bit key 22 rounds
512-bit key 30 rounds
1024-bit key 38 rounds

QUANTUM-RESISTANT SIM CARD

TECHNICAL FIELD

The present disclosure relates generally to a SIM card, meaning a chip-card device.

BACKGROUND ART

It is generally known to use a SIM card in conjunction with a mobile device.

SIM stands for subscriber identity module or subscriber identification module. It would then follow that a SIM card contains unique information that identifies it to a specific mobile network, which allows the subscriber (like you) to use the communication features of the device.

Some mobile devices need a SIM card in order to identify the owner and communicate with the mobile network. Hereafter, we refer to mobile phones using removable SIM cards for the sake of simplicity, however any mobile device using a SIM card, embedded or not, is to be understood as equally regarded by the present invention.

A SIM card just looks like a small piece of plastic. The important part is a small integrated chip which is able to be read by the mobile device it's inserted into, and contains a unique identification number, the phone number, and other data specific to the user that it's registered to.

In the following, 1G refers to the first generation of wireless cellular technology, 2G refers to the second generation of technology, and so on.

The 2G telephone technology dates from 1991 and introduced call and text encryption, along with data services such as SMS, picture messages, and MMS.

The introduction of 3G networks in 1998 ushered in faster data-transmission speeds than 2G. This also made available a bundle of improvements that substantially improved security over the original GSM.

One caveat for a 3G/LTE user, is that she/he may not be using it. Most phones are programmed to gracefully 'fail over' to GSM when a 3G/4G connection seems unavailable. Active attackers exploit this feature to implement a rollback attack—jamming 3G/4G connections, and thus re-activating all of the GSM attacks available for 2G.

Hence there appears a need to improve security in existing 2G, 3G and 4G mobile phones, this being crucial for the users who use the mobile phone to effect confidential network transactions.

One of the problems that the invention aims to overcome is the provision of improved security in existing 2G, 3G and 4G mobile phones.

SUMMARY

According to one aspect of the present invention, a quantum resistant SIM card is configured to enable access to mobile or integrated telecommunications networks for a cellular communication device, and comprises: encryption means configured for an encryption of data by a standard of at least 256-bit encryption from the list comprising at least AES-256 as defined in the ISO/IEC 18033-3:2011 standard and eAES; dynamic loading means configured to dynamically load in an intended legacy communication device an upgraded protocol stack enabling the intended legacy communication device to connect to a New Radio network by reusing existing frequencies mastered by the intended legacy communication device; and at least one hardware accelerator system which enables the SIM card to provide support for the encryption of data according to the standard of at least 256-bit encryption from the list comprising at least AES-256 as defined in the ISO/IEC 18033-3:2011 standard and eAES.

In a preferred embodiment the eAES comprises a rounds function and a key schedule, the rounds function being based on AES, and the key schedule being either one of the combinations in the list at least comprising SHA2+HKDF, SHA3(cSHAKE).

In a further preferred embodiment, the combination SHA2+HKDF, sub-keys are calculated based on an intended user's key using an HKDF expansion of the user's key, a cipher formal name string and a round count.

In a further preferred embodiment, cSHAKE is used as a key derivation mechanism in the construction of eAES.

The above and other objects, features and advantages of the present invention and the manner of realizing them will become more apparent, and the invention itself will best be understood from a study of the following description with reference to the attached drawings showing some preferred embodiments of the invention.

BRIEF DESCRIPTION OF THE SEVERAL VIEWS OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 5 contains an illustration of pseudo-code for a secure key expansion function according to an example of the invention.

Herein, identical reference numerals are used, where possible, to designate identical elements that are common to the figures. Also, the images are simplified for illustration purposes and may not be depicted to scale.

DETAILED DESCRIPTION OF THE SEVERAL EMBODIMENTS

Figure 1:
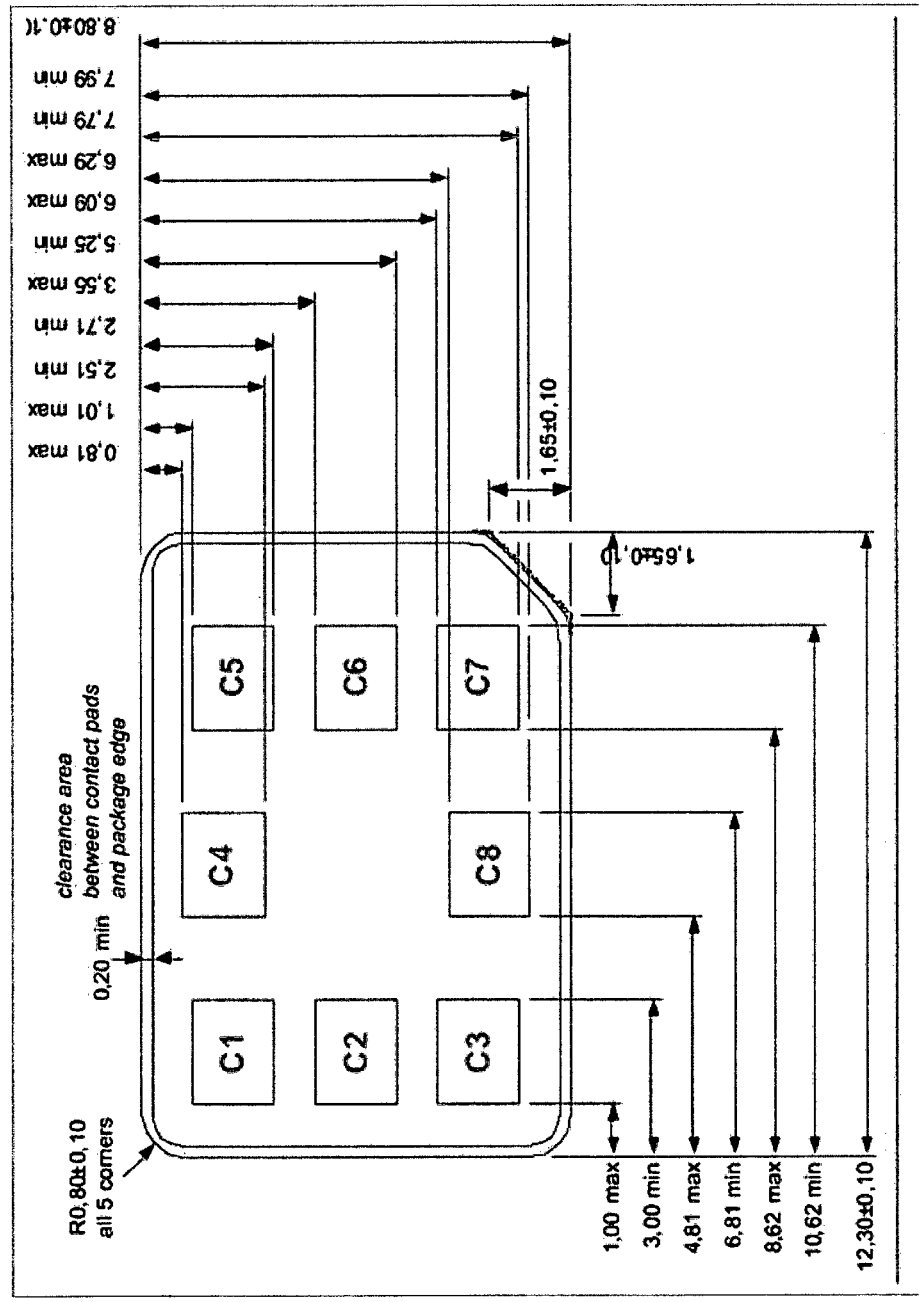
FIG. 1 shows an example of a UICC-based SIM card known from prior art, and that may be used to implement the invention.

The invention relates to a SIM card, meaning a chip-card device. SIM cards are described in patent publications, examples of which are DE101009006487 A1, U.S. Pat. Nos.

5,442,704 A, 5,491,827A and 6,859,650, which are incorporated herein by reference. The terms "SIM card" and "SIM" however may include any type of smart card which enables the same or similar types of functions as the SIM. The SIM card is considered independently of its form factor, or embedded/integrated nature. The SIM card is further considered to be intended to access mobile or integrated telecommunications networks, and to enable an end user to communicate securely, with 256-bit symmetric encryption as the minimum security level, even when the user uses a legacy phone meant only for 2G, 3G or 4G networks lacking such encryption by default, provided the telecommunications operator adapts the operator counterpart to the communication to support such encryption.

Specifically, the SIM card according to the invention preferably is enabled to support at least following encryption algorithms:

AES-256 as defined in the corresponding ISO/IEC 18033-3:2011 standard, and eAES as defined hereafter in the provided algorithmic and flow chart description, enabling key sizes up to 512-bit in this present design (theoretically, up to 1024-bit keys are supported but out of scope).

As eAES is a fairly recent denomination, we cite here a definition provided to ISO in view of its standardisation: the goal of eAES is to extend 18033 with a new key schedule for AES with key size >=256. 18033 of course is an ISO number. eAES is described in more detail in the publication "towards post-quantum symmetric cryptography, John Gregory Underhill and Stiepan Aurélien Kovac, and Xenia Bogomolec", available online at https://eprint.iacr.org/2019/553.pdf, this document being incorporated herein by reference. eAES, an evolved AES, brings a modified key schedule to AES, which is based on cryptographically-secure key derivation functions, enabling to make classical attacks such as related-key attacks impossible and make side-channel attacks harder, as the attacker would have to get all round keys, which (the rounds) are incremented. Given its quantum-safe focus, it enables keys >=256 bits, in line with what NIST IR 8105 anticipated (double the key size). The new maximum proposed size is 512.

In case a smart card is used, as opposed to restricting to a SIM card, eAES may be used in conjunction with DUKPT. It is to be noted that ANSI X9.24-3-2017 is the reference for the DUKPT standard.

Specifically, the case where a legacy device uses the SIM card according to the invention, joins a New Radio (NR) network («5G») which uses frequencies of other previous GSM generations (2G, 3G and/or 4G) is supported here, provided the operator made a switch to such an upgraded legacy network, instead of deploying a full-blown 5G network. At the same time, the SIM card according to the invention makes so-called «downgrade attacks» on the communications' security, which aim to reduce the security level of the same to 2G, which is near to none, due to the available decryption hardware today, ineffective.

The SIM card according to the invention hence solves two major problems of the current, interconnected society. This is especially true in countries where people rely on their mobile devices as their only access to bank services, with all the security implications this has. For this reason, the eAES algorithm, in its 256-bit variant, is to be used by default, both for integrity protection and encryption, likewise the corresponding key, to identify the user in the network.

The eAES algorithm enables quantum-resistance, namely resistance to computers that are envisioned to come on the market by 2023-2033, according to experts of the subject matter, including leading tech company IBM, by upgrading the weak AES original key schedule so that it becomes cryptographically-secure, including against attacks by such computers AND doesn't enable related-key attacks either (that are possible with original AES key schedule and made more likely by quantum computers). The SIM card according to the invention, enables quantum-resistant mobile and converged communications. Furthermore, the SIM card according to the invention makes this possible without replacing the devices using it, in the case of its removable version, making it possible to transition to 5G networks smoothly and ecologically.

In the same vein, on the side of the telecom operators' infrastructure, the switch to eAES will enable reuse of existing hardware optimized for running AES, leading hence to similar effects in terms of financial and ecological cost savings.

The feature SIM card as used herein includes the legacy SIM card technology, but also technologies well known in the art under the names eSIM, SoC and UICC. An eSim is, as its name indicates, an embedded SIM and a SIM SoC (System on Chip) emulates the function of a conventional SIM card.

In the following, we will mention the term UICC, which may be used interchangeably with SIM card for the purpose of this invention. The term UICC stands for Universal Integrated Circuit Card. UICC is a more recent generation SIM used in high speed wireless networks. The UICC identifies the user to his/her wireless operator so they know your plan and services. It may store the user's contacts and enables a secure and reliable voice and multi-media data connection, global roaming and remotely adds new applications and services. The UICC is known as universal application delivery platform that works with any 3G or 4G device. For 2G devices it is common to use the conventional SIM card.

A big advantage of the UICC over the SIM, however, is it can have multiple applications on it. One of these, the USIM application, is what identifies you and your phone plan to your wireless service provider using one of these standards: Universal Mobile Telecommunications System (UMTS), High Speed Packet Access (HSPA) or Long Term Evolution (LTE). Another application, the CDMA SIM (CSIM), enables access to CDMA networks, which are different from GSM or UMTS networks. Other possible applications include ISIM, to secure mobile access to multimedia services, and non-telecom applications such as payment. For example, many subscribers have a UICC with USIM and ISIM applications for phone service and multimedia respectively.

Another advancement is that the UICC can communicate using Internet Protocol (IP), the same standard used in the Internet and the new generation of wireless networks. It also can support multiple PIN codes, which can contribute in preventing third parties from misusing personal information.

FIG. 1 shows an example of a UICC card that may be used to implement the invention. Contacting elements in the terminal in positions C4 and C8 are optional. If present and not used, they shall either be pulled to state L or present a high impedance to the UICC. If it is determined that the UICC is a multi-application UICC, or if the terminal supports optional interfaces using these contacts, then these contacts may be used. Contact C6 need not be provided for Plug-in/Mini-UICC. The UICC card (or SIM card in whatever form factor) shall further integrate hardware accelerators enabling to run SHA-2, HMAC and AES algorithms without implementing them in software, with SHA-3

(CSHAKE) as an optional add-on, on top of its microprocessor and integrated memory, which are beyond the scope of the present invention, which intends to reuse industry-standard components such as, but not limited to, ARM cores, to that end.

Figure 3:
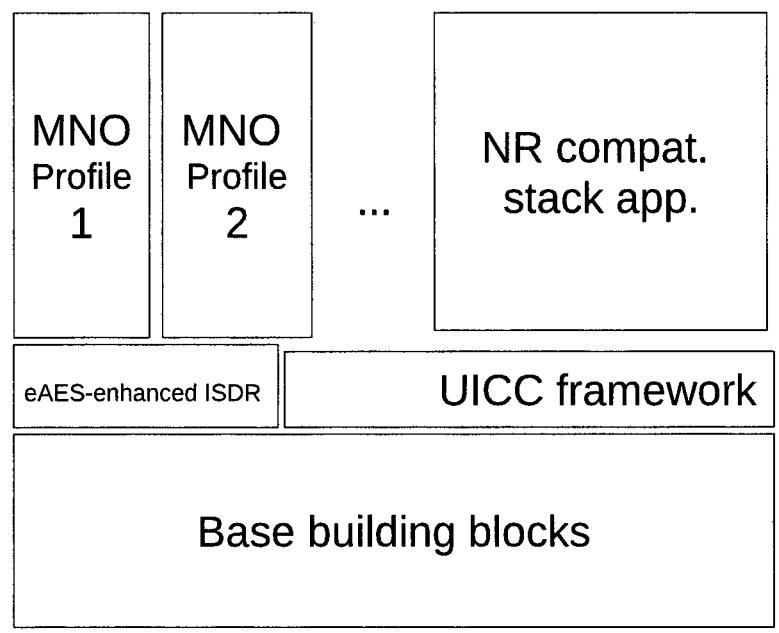
FIG. 3 illustrates an example of software layers with an NR compatibility stack application as implemented in the case of an UICC-based SIM card supporting multiple MNO profiles, according to the invention.

The SIM card according to the invention embeds an application that dynamically loads in a legacy device, using a protocol for transmission of digital information available for the SIM card technology in use, as is well known in the art, to provide the legacy device an upgraded protocol stack (see FIG. 3 for an example representation of different software layers in a UICC system, including the upgraded protocol stack, labeled "NR compatibility stack application"—note concerning "eAES-enhanced ISDR": while ISDR (Issuer Security Domain—Root) is a GlobalPlatform expression, here the invention provides a replacement of the AES cipher in [1] by an eAES-upgraded (non-standard) version of [1], that will hopefully be standardized in the future. As this may pose problems in some usage scenarios, use of [1] as is, relying on the original AES, is supported, by the fact that the invention also supports AES-256 and SHA2(-512) as in [1], this combination being the strongest encryption profile supported by [1]. Weaker profiles are not. Reference [1]: GlobalPlatform: Secure channel protocol '3'—card specification v2.2—amendment d v1.1.1 (July 2014)) to connect to New Radio (NR, also called 5G) networks reusing existing 2G, 3G or 4G frequencies, whatever those might be in the country of use, when the operator wishes to use such a design (the operator may as well use existing 3G or 4G networks with upgraded encryption). In NR terminology, what it does specifically is to allow compatibility with bearer type NG-RAN, independently of the chosen frequency by the Mobile Network Operator (MNO), may the latter choose to use such a bearer type. To achieve that goal, it uses the Call control by USIM feature described in 3GPP TS 31.111 version 9.4.0 Release 9 to replace calls and/or USSD operations by secure equivalent operations on the NR network. The latter part is also true when the MNO chooses not to use NR for USSD messages, e.g. USSD messages will be replaced by secure equivalents using eAES encryption, also described in the present invention. FIG. 3 illustrates how this should be implemented in the case of an UICC-based SIM card supporting multiple MNO profiles.

In the case of newer, 4G phones, whose radio can be software-upgraded, this can be combined with software upgrades, enabling in some cases connectivity to «true» NR networks. The same rationale applies to 5G devices, as far as the AES algorithm and its upgrade to eAES is concerned (e.g. a software update will enable the switch to eAES on those devices). The protocol stacks in question being standard, they are not described in detail here.

Figure 2:
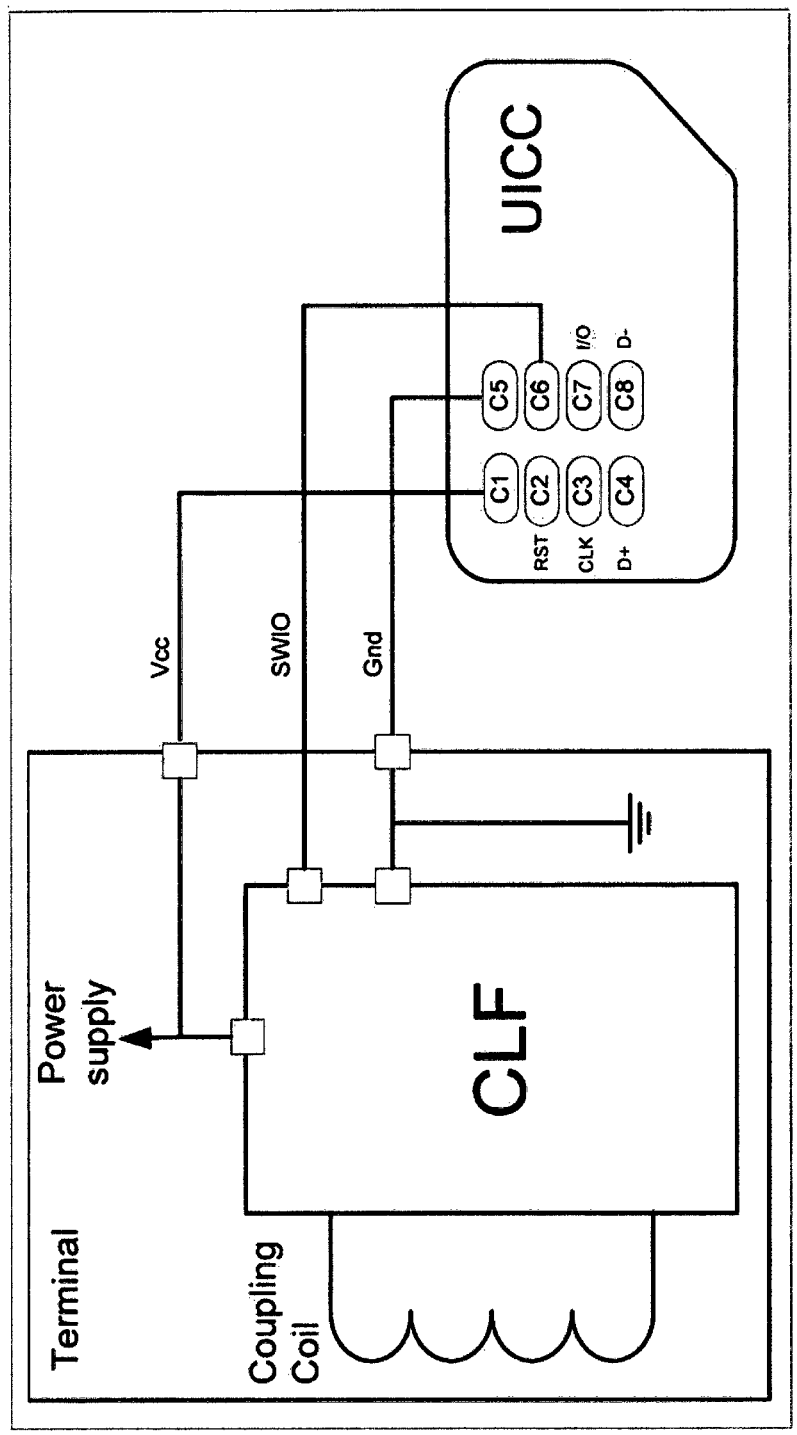
FIG. 2 shows an example connection between a UICC-based SIM card and a contact-less front-end (CLF), according to prior art.

We will now describe an example of communication interface between SIM card and legacy communication device. FIG. 2 shows an example connection between a UICC-based SIM card and a contact-less front-end (CLF), according to prior art. Vcc (contact C1) and Gnd (contact C5) provided in the UICC shall be reused by the terminal to provide power supply. SWIO (contact C6) of the UICC shall be used for data exchange between the UICC and the CLF.

The SIM card comprises at least one hardware accelerator system, which enables the SIM card to support the eAES algorithm. The at least one hardware accelerator shall provide support for one or more of the following: Secure Hashing Algorithm 2 (SHA-2)+Hash-based Message Authentication Code (HMAC) or SHA-3 (in particular, its CSHAKE key derivation function). A computer code of the "glue" type is configured to run eAES while benefiting of an optimal hardware acceleration. Preferably, the SHA-2+HMAC (-based Key Derivation Function) is used in order to provide the best level of compatibility.

Figure 4:
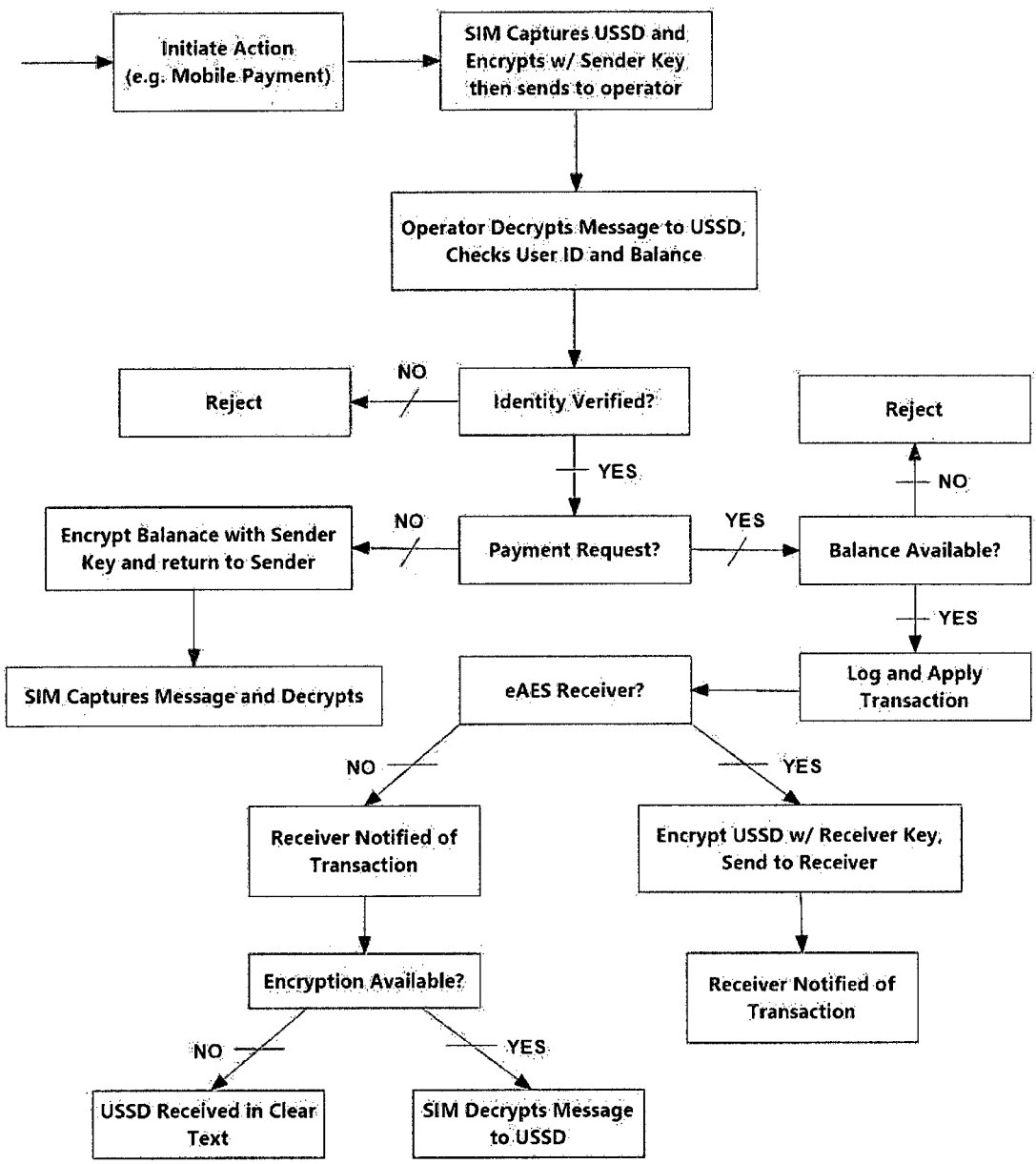
FIG. 4 contains a flowchart illustrating a transaction effected according to an example implementation of the invention.

FIG. 4 contains a flowchart illustrating a method of a transaction effected using a SIM card according to the invention.

First, in the box [Initiate action (e.g. mobile payment)] an action is initiated in the communication device housing the SIM card, for example through a user interface by an intended user (both not shown in FIG. 4).

In a next step the initiated action is passed on to the SIM card as USSD in box [SIM captures USSD and encrypts w/sender key then sends it to operator] where it is encrypted using the user's key (sender key) and sent to the operator that operates the network in which the user is connected with the communication device. USSD stands for Unstructured Supplementary Service Data and is a Global System for Mobile (GSM) communication technology that is used to send text between a mobile phone (communication device) and an application program in the network. USSD is similar to Short Messaging Service (SMS), but, unlike SMS, USSD transactions occur during the session only. In the present example, USSD will be used to initiate a mobile payment, "mobile" because it is initiated from the communication device. The term Operator is employed here as designating either one of for example a mobile network operator, a bank, a clearing institution. Hence those meanings are interchangeable with the term Operator.

In a next step the encrypted USSD received by the operator is handled by the operator in box [Operator decrypts message to USSD, checks User ID and Balance], where the operator decrypts the message from the USSD, checks the User ID, and a balance of an account belonging to the user associated to the User ID, hence determining whether the mobile payment may be transacted from the account.

In a next step, a decision is made in box [Identity Verified ?] depending on the fact whether the check of User ID is positive or negative. If negative, the initiated action is rejected in box [Reject] where the method ends. If positive, the method proceeds to box [Payment Request?].

In a next step from box [Payment Request?] it is decided/ checked whether a payment is intended through the initiated case. If positive the method proceeds to the check/decision in box [Balance Available?]. If negative the method proceeds to box [Encrypt Balance with Sender Key and return to Sender].

In a next step, in box [Balance Available?], the account balance is checked against the desired amount of payment. In case the amount is greater than the amount revealed by the balance, the method proceeds to the box [Reject] where the method ends. In case the amount is equal or smaller than the balance, the method proceeds to box [Log and Apply Transaction]

In the step of box [Log and Apply Transaction] the actual required handling of logging the transaction, and effecting the transaction itself are executed.

In a next step of box [Log and Apply Transaction] the method proceeds to decision box [eAES Receiver?]. In this box it is determined whether the receiver of the transaction can be contacted through secure messaging using eAES encryption. If positive, the method proceeds to box [Encrypt USSD w/Receiver Key, Send to Receiver]. If negative the method proceeds to box [Receiver Notified of Transaction] which triggers a notification to the Receiver about the transaction.

If the method was directed to box [Encrypt USSD w/Receiver Key, Send to Receiver] a USSD is prepared with an encrypted message and the method proceeds to the box [Receiver notified of transaction] where the encrypted USSD is used in the notification to the receiver of the transaction.

In a next step departing from box [Receiver Notified of Transaction], a decision in box [Encryption available?] checks whether the notification may be encrypted or not. If positive the encrypted USSD is decrypted in Receiver's SIM as represented by box [SIM Decrypts Message to USSD]. If negative, the notification in form of a non-encrypted USSD is received by the Receiver in clear as hinted by box [USSD Received in Clear Text].

A transaction, after having been applied and logged, may be notified in clear to the receiver if his UE is not eAES-equipped.

Returning now to the branch of the method leading to box [Encrypt Balance with Sender Key and return to Sender] this is a step intended to inform the initiating user about her available balance, whereby the value of the balance is encrypted on operator's side and sent back to the sender.

In a next step of box [SIM Captures Message and Decrypts], the encrypted message from the previous step is received in the SIM card of sender's communication device, where it is decrypted and the method ends.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims. In particular, the invention is in no way limited to the UICC SIM card format and can be applied either in the case of classical SIM cards, or in the case of newer embedded SIM cards or even Systems-on-Chip emulating a SIM card.

Modern symmetric block cipher-based encryption algorithms consist of two main parts: the key schedule, determining the resistance of the construction to attacks on the key and serving to build the round keys from the user's key, and the core encryption loop that is called for a certain number of rounds, sometimes thus abbreviated as «rounds function». In the AES standard, the key schedule relies primarily on the XOR (eXclusive OR) binary operation and cannot thus be considered cryptographically-secure. This puts a burden on implementers to find workarounds to make the key safe against related-key attacks when using key sizes higher than 128 bits, a must-have for quantum-resistance. Hereafter, a solution to that problem is provided, that is both elegant and compatible with existing server hardware, notably Intel processors with AES-NI and SHA-NI instructions.

Coming now to the encryption mechanism that is implemented in the SIM card of the intended user/sender, this makes use of eAES, which in turn uses a rounds function and a key schedule.

The rounds function is identical to the AES specification, thereby enabling hardware compatibility with existing CPU optimizations for AES. The number of rounds processed in the main loop is determined by the value of Nr and differs from the AES specification (it bases instead on the recommendations of the original Rijndael design that served as a base for the AES). This means that the core AES loop will be executed more times than in the AES standard, the exact number of times being defined by Nr, so as to attain a greater margin of security.

An overview of the secure key expansion function is illustrated in FIG. 5 as pseudo-code. The octet key size ks is calculated as the ciphers block size in 32-bit words Nb, times the number of rounds Nr+1, times the number of octets in each 32-bit word. The temporary array of bytes tmp is generated by HKDF Expand (or alternatively cSHAKE) using the input cipher key and the optional distribution code dc array as input. HKDF is a simple key derivation function (KDF) based on a hash-based message authentication[1] code (HMAC). The main approach that is followed here is HKDF expand, where the KDF logically "expands" a key into several additional pseudo-random keys (the output of the KDF). It is formally described in the RFC 5869. cSHAKE is a customizable variant of the SHAKE functions defined in FIPS 202. SHAKE (Secure Hash Algorithm and KECCAK) is an Extendable-Output Function (or XOF). It's like SHA-3 but with variably sized output. The use of either HKDF or cSHAKE makes the key schedule cryptographically-secure, as opposed to the original AES key schedule based on XOR. Higher SHA-2 and SHA-3 profiles such as SHA-2 512 are considered to be quantum-resistant, thereby making the whole construction quantum-resistant, as the rounds function itself is considered quantum-resistant if working with a large enough key, namely of at least 256 bits according to current knowledge. This array of octet sized integers is then converted to 32-bit words and added to the rounds sub-key array w.

Figure 6:
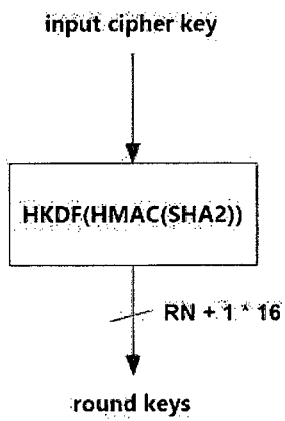
FIGS. 6 and 7 provide flowcharts about the execution respectively of Key Schedule and Rounds function, being noted that the secure key expansion of FIG. 5 is used for the key schedule and that the rounds function is equal to the AES rounds function, as defined in the ISO/IEC 18033-3:2010 standard and provided here for informational purposes, being a standard component that is reused to provide an improved version of the standard, thanks to the improved key schedule.
Figure 7:
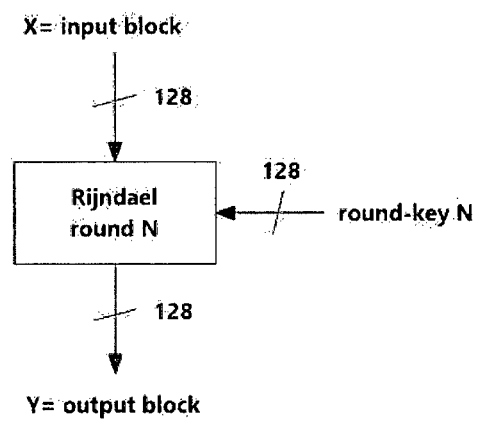

FIGS. 6 and 7 provide flowcharts about the execution respectively of Key Schedule and Rounds function.

FIG. 6 describes the default HKDF(HMAC(SHA2)) key schedule in eAES, where based on the input cipher key (the user's key), sub-keys are calculated using HKDF expansion of the key, cipher formal name string and round count, as described more in detail in the pseudo-code in FIG. 5. As to FIG. 7, this describes an example of implementation using SHA2+HKDF, there is no use in describing the rounds function in further detail here as it is an exact equivalent of the AES rounds function. Readers are referred to ISO/IEC 18033-3:2011, or the corresponding NIST publication, both of which are available under FRAND terms, for further details. The same holds for the details of HKDF, which is published as an IETF standard and thus freely available on the Internet. Last but not least, SHA-2 being also a NIST standard, it is available on the NIST website.

As already mentioned herein above any smart card is to be included to be adapted instead of the SIM card, as long as it enables the same type of functions as the SIM, including for payment, without however relying on USSD messages, which are specific to GSM systems, and thus involve the use of the SIM card as such.

The invention claimed is:

1. A quantum resistant Subscriber Identity Module (SIM) card configured to enable access to mobile or integrated telecommunications networks for a cellular communication device, comprising:
encryption means configured for an encryption of data by a standard of at least 256-bit encryption from a list comprising at least Advanced Encryption Standard (AES)-256 as defined in the International Organization for Standardization (ISO)/International Electrotechnical Commission (IEC) 18033-3:2011 standard and Enhanced AES (eAES);
dynamic loading means configured to dynamically load in an intended legacy communication device an upgraded protocol stack enabling the intended legacy communication device to connect to a New Radio network by reusing existing Global System for Mobile Communications (GSM) frequencies mastered by the intended legacy communication device and allowing compatibility with bearer type Next Generation Radio Access Network (NG-RAN); and at least one hardware accelerator system which enables the quantum resistant SIM card to provide support for the encryption of data according to the standard of at least 256-bit encryption from the list comprising at least AES-256 as defined in the ISO/IEC 18033-3:2011 standard and eAES.

2. The quantum resistant SIM card of claim 1, wherein the eAES comprises a rounds function and a key schedule, the rounds function being based on AES, and the key schedule being either one of the combinations in a list at least comprising Secure Hash Algorithm 2 (SHA2)+Handkerchief (HKDF) and Secure Hash Algorithm 3 (SHA3) customizable Secure Hash Algorithm and KECCAK (cSHAKE).

3. The quantum resistant SIM card of claim 2, where in the combination SHA2+HKDF, sub-keys are calculated based on an intended user's key using an HKDF expansion of the user's key, a cipher formal name string and a round count.

4. The quantum resistant SIM card of claim 2, wherein cSHAKE is used as a key derivation mechanism in the construction of eAES.

5. The quantum resistant SIM card of claim 1, wherein the rounds function is executed more times than in an AES standard.

6. The quantum resistant SIM card of claim 1, wherein the New Radio network is a 5G network.

7. The quantum resistant SIM card of claim 1, wherein the existing frequencies are 2G, 3G, or 4G.

8. The quantum resistant SIM card of claim 1, wherein the eAES allows for up to 512-bit key sizes.

9. The quantum resistant SIM card of claim 1, wherein the SIM card is further configured to perform downgrade attacks on communications security which reduces a security level of the SIM card to 2G communication security levels.

10. The quantum resistant SIM card of claim 1, wherein the quantum resistant SIM card is an embedded Subscriber Identity Module (eSIM) card.

11. A method of communicating on a New Radio network using a legacy device, comprising:

dynamically loading, in a Subscriber Identity Module (SIM) card of a legacy communication device, an upgraded protocol stack enabling the intended legacy communication device to connect to New Radio networks;

communicating to a New Radio network by using existing Global System for Mobile Communications (GSM) communication frequencies the legacy device is operable to communicate with and by allowing compatibility with bearer type Next Generation Radio Access Network NG-RAN; and encrypting data by a hardware accelerator of the SIM card using an encryption standard from the list of Advanced Encryption Standard (AES)-256 as defined in the International Organization for Standardization (ISO)/International Electrotechnical Commission (IEC) 18033-3: 2011 standard and Enhanced Advanced Encryption Standard (eAES).

12. The method of claim 11, wherein:

the eAES comprises a rounds function and a key schedule, the rounds function being based on AES, and the key schedule being either one of the combinations in a list at least comprising Hash Algorithm 2 (SHA2)+ Handkerchief (HKDF) and Secure Hash Algorithm 3 (SHA3) customizable Secure Hash Algorithm and KECCAK (cSHAKE).

13. The method of claim 12, where in the combination SHA2+HKDF, sub-keys are calculated based on an intended user's key using an HKDF expansion of the user's key, a cipher formal name string and a round count.

14. The method of claim 12, wherein cSHAKE is used as a key derivation mechanism in the construction of eAES.

15. The method of claim 11, wherein the rounds function is executed more times than in an AES standard.

16. The method of claim 11, wherein the New Radio network is a 5G network.

17. The method of claim 11, wherein the existing frequencies are 2G, 3G, or 4G.

18. The method of claim 11, wherein the eAES allows for up to 512-bit key sizes.

19. The method of claim 11, wherein the SIM card is further configured to perform downgrade attacks on communications security which reduces a security level of the SIM card to 2G communication security levels.

20. The method of claim 11, wherein the quantum resist SIM card is an embedded SIM (eSIM) card.

21. The method of claim 13, wherein Secure Hash Algorithm 3 (SHA3) is used instead of SHA-2.

* * * * *